United States Patent Office 2,729,648
Patented Jan. 3, 1956

2,729,648

5-THENYLIDENE DERIVATIVES OF CREATININE

Kurt J. Rorig, Evanston, Ill., assignor to G. D. Searle & Co., Chicago, Ill., a corporation of Illinois No Drawing. Application June 17, 1954,
Serial No. 437,561

5 Claims. (Cl. 260—309.7)

My present invention is concerned with a new group of organic compounds containing two heterocyclic nuclei and, more particularly, with 5-thenylidenecreatinines and acylcreatinines.

The compounds which constitute my invention can be represented by the general structural formula

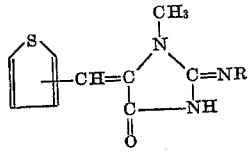

wherein R is a hydrogen or lower alkylcarbonyl radical. The radical R represents a hydrogen atom or a lower acyl radical derived from a lower aliphatic acid such as acetic, propionic, butyric, isobutyric, valeric, hexanoic, cyclohexylacetic, cyclopentylpropionic acid, and the like.

The compounds of my invention afford valuable diuretic and cardioregulatory agents. They are also valuable as intermediates in organic synthesis. Thus the 2-imino group can be alkylated to yield the corresponding 2-alkylimino derivatives. Also the 5-thenylidene group can be reduced in the presence of sodium amalgam to yield the corresponding 5-thenyl derivatives.

The following examples will illustrate in further detail the compounds which constitute my invention and methods for their synthesis. However, the invention is not to be construed as limited thereby in spirit or in scope. In these examples quantities of materials are indicated in parts by weight.

Example 1

A mixture of 49 parts of creatinine, 110 parts of fused sodium acetate, 75 parts of 2-thiophenealdehyde and 350 parts of acetic anhydride is heated at reflux for 80 minutes and then poured with mechanical stirring into 3000 parts of water containing 400 parts of ethanol. The resulting precipitate is collected on a filter, washed with water and recrystallized from glacial acetic acid. After washing with ethanol and drying, golden yellow flakes of 1 - methyl - 2 - acetylimino - 5-(2' - thenylidene) - 4-imidazolidone are obtained which melt at about 239–240° C. The compound has the structural formula

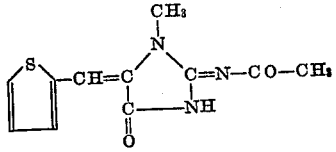

1 - methyl - 2 - acetylimino - 5 - (3' - thenylidene) - 4-imidazolidone is obtained by substituting an equivalent amount of 3-thiophenealdehyde for the 2-thiophenealdehyde. The product is obtained in light orange prismatic needles.

Example 2

A mixture of 10 parts of 1-methyl-2-acetylimino-5-(2'-thenylidene)-4-imidazolidone and 115 parts of concentrated hydrochloric acid are placed in an evaporating dish and heated on the steam bath for 15 minutes. 65 additional parts of concentrated hydrochloric acid are added and the mixture is heated for 90 minutes on the steam bath and cooled. The yellow solid precipitate is collected on a filter and taken up at once in 600 parts of warm water and filtered. The filtrate is made basic with ammonium hydroxide solution and the golden precipitate is collected on a filter, washed with water and dried. On recrystallization from ethanol, light yellow crystals of 5-(2'-thenylidene)-creatinine are obtained which melt at about 279–280° C. with decomposition. The product is poorly soluble in ethanol, isopropanol, ethoxyethanol, dioxane, ethyl acetate, and 1-nitropropane.

Example 3

A mixture of 100 parts of creatinine, 150 parts of 3-thiophenealdehyde, 295 parts of sodium butyrate and 1070 parts of butyric anhydride is refluxed for 2 hours and then poured into 7000 parts of a stirred 15% aqueous ethanol solution. The precipitate is collected on a filter, and washed with ethanol. 1-methyl-2-butyrylimino 5-(3'-thenylidene)-4-imidazolidone is thus obtained in fine prismatic yellow crystals. The compound has the structural formula

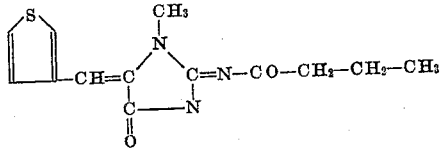

I claim:
1. A compound of the structural formula

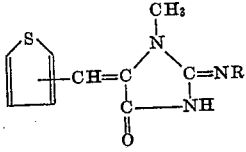

wherein R is a member of the class consisting of hydrogen and (lower alkyl)-CO radicals.
2. 5-thenylidenecreatinine.
3. 1 - methyl - 2 - (lower)alkylcarbonylimino - 5 - (2'-thenylidene)-4-imidazolidone.
4. 1 - methyl - 2 - acetylimino - 5 - (2'-thenylidene)-4-imidazolidone.
5. 1 - methyl - 2 - (lower)alkylcarbonylimino - 5 - (3'-thenylidene)-4-imidazolidone.

References Cited in the file of this patent

Erlenmeyer: Liebigs Ann., vol. 284, p. 49 (1895).
Nicolet et al.: J. Am. Chem. Soc., vol. 50, pp. 1155–9 (1928).
Richardson et al.: J. Am. Chem. Soc., vol. 51, p. 3077 (1929).
Barger et al.: J. Chem. Soc., vol. 1938, pp. 2100–4.